(12) United States Patent
Marcé et al.

(10) Patent No.: US 6,941,129 B2
(45) Date of Patent: Sep. 6, 2005

(54) TELECOMMUNICATION SYSTEM, AND MOBILE STATION, AND DATABASE, AND METHOD

(75) Inventors: Olivier Marcé, Massy Palaiseau (FR); Claire Bazin, Paris (FR)

(73) Assignee: Alcatel, Paris (FR)

( * ) Notice: Subject to any disclaimer, the term of this patent is extended or adjusted under 35 U.S.C. 154(b) by 697 days.

(21) Appl. No.: 09/935,571

(22) Filed: Aug. 24, 2001

(65) Prior Publication Data

US 2002/0052202 A1 May 2, 2002

(30) Foreign Application Priority Data

Aug. 25, 2000 (EP) .............................. 00440232

(51) Int. Cl.$^7$ ............................................... H04M 3/00
(52) U.S. Cl. ................ 455/414.1; 455/456.3; 455/435.1; 455/419
(58) Field of Search .................. 455/414.1, 456.3, 455/435.1, 418, 419, 414, 415

(56) References Cited

U.S. PATENT DOCUMENTS

| | | |
|---|---|---|
| 4,173,016 A | 10/1979 | Dickson |
| 5,086,394 A | 2/1992 | Shapira |
| 5,539,395 A | 7/1996 | Buss et al. |
| 6,014,090 A | 1/2000 | Rosen et al. |
| 6,052,122 A * | 4/2000 | Sutcliffe et al. ............ 715/751 |
| 6,549,768 B1 * | 4/2003 | Fraccaroli ................ 455/456.3 |
| 6,618,593 B1 * | 9/2003 | Drutman et al. ......... 455/456.3 |
| 6,819,919 B1 * | 11/2004 | Tanaka ..................... 455/414.1 |

FOREIGN PATENT DOCUMENTS

| | | |
|---|---|---|
| DE | 19608942 A1 | 9/1997 |
| EP | 0 952 744 A2 | 10/1999 |
| WO | WO 97/24627 | 7/1997 |

* cited by examiner

*Primary Examiner*—Fan Tsang
*Assistant Examiner*—Simon Sing
(74) *Attorney, Agent, or Firm*—Sughrue Mion, PLLC

(57) ABSTRACT

Known telecommunication systems comprising a network with fixed stations and comprising mobile stations for sending identification codes to said network via fixed stations and for allowing mobile communication to subscribers using said mobile phones, with said network comprising a database for storing subscriber-information, can offer more services by storing in said database subscriber-information related to identification codes for allowing subscriber-information to be exposed to further subscribers, with update codes being used for updating said subscriber-information. Preferably, said update codes define the amending of subscriber-information already stored or the storing of new subscriber-information, and an analyser is used for analysing subscriber-information and in dependence transmitting messages. Further, purpose codes are used to define which parts of said subscriber-information is to be analysed and/or to be amended and/or to be exposed, and location codes are introduced to introduce borderlines.

10 Claims, 1 Drawing Sheet

TELECOMMUNICATION SYSTEM, AND MOBILE STATION, AND DATABASE, AND METHOD

BACKGROUND OF THE INVENTION

The invention relates to a telecommunication system comprising a network with fixed stations and comprising at least one mobile station for sending an identification code to said network via at least one fixed station and for allowing mobile communication to a subscriber using said mobile station, with said network comprising a database for storing subscriber-information.

Such a telecommunication system is known from U.S. Pat. No. 5,086,394 which discloses an introduction system for locating compatible persons and comprising a network (U.S. Pat. No. 5,086,394: master control unit 12+telephone exchange) with fixed stations (U.S. Pat. No. 5,086,394: local/base control units 16) and several mobile stations (U.S. Pat. No. 5,086,394, column 3 lines 8–11: personal devices 14 like beepers, radio transceivers and cordless/cellular telephones) for sending an identification code (U.S. Pat. No. 5,086,394, column 8 lines 29–30: personal coded signals from the user's personal device) to said network via at least one fixed station and for allowing mobile communication to a subscriber using said mobile station (U.S. Pat. No. 5,086, 394, column 3 lines 8–11: personal devices 14 like radio transceivers and cordless/cellular telephones), with said network comprising a database (U.S. Pat. No. 5,086,394: master control unit 12 and/or local/base control unit 16) for storing subscriber-information.

Such a telecommunication system is disadvantageous, inter alia, due to users needing to enter a membership card into a fixed station for activating said system.

SUMMARY OF THE INVENTION

It is an object of the invention, inter alia, to provide a telecommunication system, which offers services to users in a more user-friendly way.

Thereto, the telecommunication system according to the invention is characterised in that said database comprises subscriber-information related to said identification code for allowing at least a part of said subscriber-information at least to be exposed to at least one further subscriber, with said mobile station comprising a transmitter for transmitting an update code to said network via at least one fixed station, and with said network comprising a receiver for receiving said update code for updating at least a part of said subscriber-information stored in said database.

By providing said database with subscriber-information related to said identification code for allowing at least a part of said subscriber-information at least to be exposed to at least one further subscriber, and by also providing said mobile station with said transmitter for transmitting said update code to said network via at least one fixed station, and said network with said receiver for receiving said update code for updating at least a part of said subscriber-information stored in said database, compared to U.S. Pat. No. 5,086,394 (where information is entered via a membership card, after which the mobile stations are used for detecting and/or informing users), a completely new and advantageous system has been created whereby subscribers via their mobile stations activate the offering of services by generating update codes and whereby subscriber-information stored in said database can be exposed to other subscribers via said mobile stations (which subscriber-information is either entered into said database via said mobile station or is entered into said database via said network without passing said mobile station).

Said mobile stations are for example wireless and/or cordless and/or mobile phones etc., for example being provided with WAP (Wireless Application Protocol) and/or with further IP (Internet Protocol) technology, and said fixed stations are for example Base Stations or Base Station Controllers or Mobile Switching Centers or UMTS-Node-B's or UMTS-RNS's etc.

The invention is based on the insight, inter alia, that mobile stations can be used and will be used for more and more purposes.

The invention solves the problem, inter alia, of providing a telecommunication system which offers more services in a more user-friendly way.

A first embodiment of the telecommunication system according to the invention is characterised in that said update code for updating at least a part of said subscriber-information defines at least either the amending of subscriber-information already stored or the storing of new subscriber-information.

In case said update code defines the amending of subscriber-information already stored, said update code will indicate which part is to be amended and/or how parts are to be amended. In case said update code defines the storing of new subscriber-information, said update code will either be accompanied by said new subscriber-information and/or will indicate where said new subscriber-information can be found in the network.

A second embodiment of the telecommunication system according to the invention is characterised in that said database comprises first subscriber-information related to a first identification code defining a first subscriber and comprises second subscriber-information related to a second identification code defining a second subscriber, with said network comprising an analyser for analysing specific subscriber-information and comprising a transmitter for in dependence of an analysis result transmitting at least one message.

By providing said network with said analyser, the advantageous updating is combined with the advantageous analysing. Said transmitter for example in dependence of a first analysis result transmits at least one message and in dependence of a second analysis result transmits at least one other message or no message at all, which messages may be sent to one or more of said mobile stations or to further parties.

A third embodiment of the telecommunication system according to the invention is characterised in that said analysing of specific subscriber-information is dependent upon a specific purpose code originating from a specific mobile station.

By making said analysing of specific (for example first or second) subscriber-information dependent upon a specific (for example first or second) purpose code originating from a specific (for example first or second) mobile station, purpose codes are introduced for defining purposes, thereby allowing said subscriber-information and/or said analysing being divided into categories. These purpose codes are sent together with said identification codes or are sent separated from them, and are either sent automatically (in which case they must be stored in said mobile station) or in response to a user action (in which case they can be stored in said mobile station or not).

A fourth embodiment of the telecommunication system according the invention is characterised in that said specific purpose code defines which part of said specific subscriber-information is at least to be analysed.

By letting said specific (for example first or second) purpose code define which part of said specific (for example first or second) subscriber-information is at least to be analysed, certain parts of said subscriber-information can be made more important and/or can be given a higher/lower priority.

A fifth embodiment of the telecommunication system according the invention is characterised in that said specific purpose code defines which part of said specific subscriber-information is at least to be amended and/or exposed.

By letting said specific (for example first or second) purpose code define which part of said specific (for example first or second) subscriber-information is at least to be amended and/or excposed, certain parts of said subscriber-information can be updated and/or be made publicly available, automatically and/or in response to a user action.

A sixth embodiment of the telecommunication system according the invention is characterised in that said analysing of specific subscriber-information is dependent upon a specific location code defining which specific fixed station is involved and/or a location of said mobile station.

By making said analysing of specific subscriber-information dependent upon a specific (for example first or second) location code defining which specific (for example first or second) fixed station is involved and/or defining a location of said mobile station, a location-dependency is introduced, whereby said location code originates from either said fixed station or from a switch coupled to said fixed station, or from said mobile station where it is generated automatically or in response to a user action.

The invention further relates to a mobile station for use in a telecommunication system comprising a network with fixed stations and comprising said mobile station for sending an identification code to said network via at least one fixed station and for allowing mobile communication to a subscriber using said mobile station, with said network comprising a database for storing subscriber-information.

The mobile station according to the invention is characterised in that said database comprises subscriber-information related to said identification code for allowing at least a part of said subscriber-information at least to be exposed to at least one further subscriber, with said mobile station comprising a transmitter for transmitting an update code to said network via at least one fixed station, and with said network comprising a receiver for receiving said update code for updating at least a part of said subscriber-information stored in said database.

Embodiments of the mobile station according to the invention are in correspondence with the embodiments of the telecommunication system according to the invention.

The invention yet further relates to a database for use in a telecommunication system comprising a network with fixed stations and comprising at least one mobile station for sending an identification code to said network via at least one fixed station and for allowing mobile communication to a subscriber using said mobile station, with said network comprising said database for storing subscriber-information.

The database according to the invention is characterised in that said database comprises subscriber-information related to said identification code for allowing at least a part of said subscriber-information at least to be exposed to at least one further subscriber, with said mobile station comprising a transmitter for transmitting an update code to said network via at least one fixed station, and with said network comprising a receiver for receiving said update code for updating at least a part of said subscriber-information stored in said database.

Embodiments of the database according to the invention are in correspondence with the embodiments of the telecommunication system according to the invention.

The invention also relates to a method for use in a telecommunication system comprising a network with fixed stations and comprising at least one mobile station for sending an identification code to said network via at least one fixed station and for allowing mobile communication to a subscriber using said mobile station, with said network comprising a database for storing subscriber-information.

The method according to the invention is characterised in that said database comprises subscriber-information related to said identification code for allowing at least a part of said subscriber-information at least to be exposed to at least one further subscriber, with said method comprises the steps of transmitting an update code from said mobile station to said network via at least one fixed station, and of receiving said update code by said network for updating at least a part of said subscriber-information stored in said database.

Embodiments of the method according to the invention are in correspondence with the embodiments of the telecommunication system according to the invention.

The method according to the invention including its embodiments defines steps having a technical character. However, these steps can be performed for any possible business purpose. Therefore, the invention also comprises a method of doing business, like a method for exposing subscriber-information related to a first subscriber to a second subscriber and/or a method for contacting compatible parties, etc.

The document U.S. Pat. No. 5,086,394 discloses an introduction system for locating compatible persons, and U.S. Pat. No. 4,173,016 discloses an interpersonal-introduction signalling system, and WO 97/24627 discloses a person identifier. U.S. Pat. No. 5,539,395 discloses a location dependent information receiving device, and U.S. Pat. No. 6,014,090 discloses an apparatus for delivering local information to travelers. Neither one of these documents discloses the telecommunication system according to the invention. All references including further references cited with respect to and/or inside said references are considered to be incorporated in this patent application.

BRIEF DESCRIPTION OF THE DRAWINGS

The invention will be further explained at the hand of an embodiment described with respect to a drawing, whereby FIG. 1 discloses a telecommunication system according to the invention comprising a mobile station according to the invention and a database according to the invention.

DETAILED DESCRIPTION OF THE INVENTION

Figure 1:
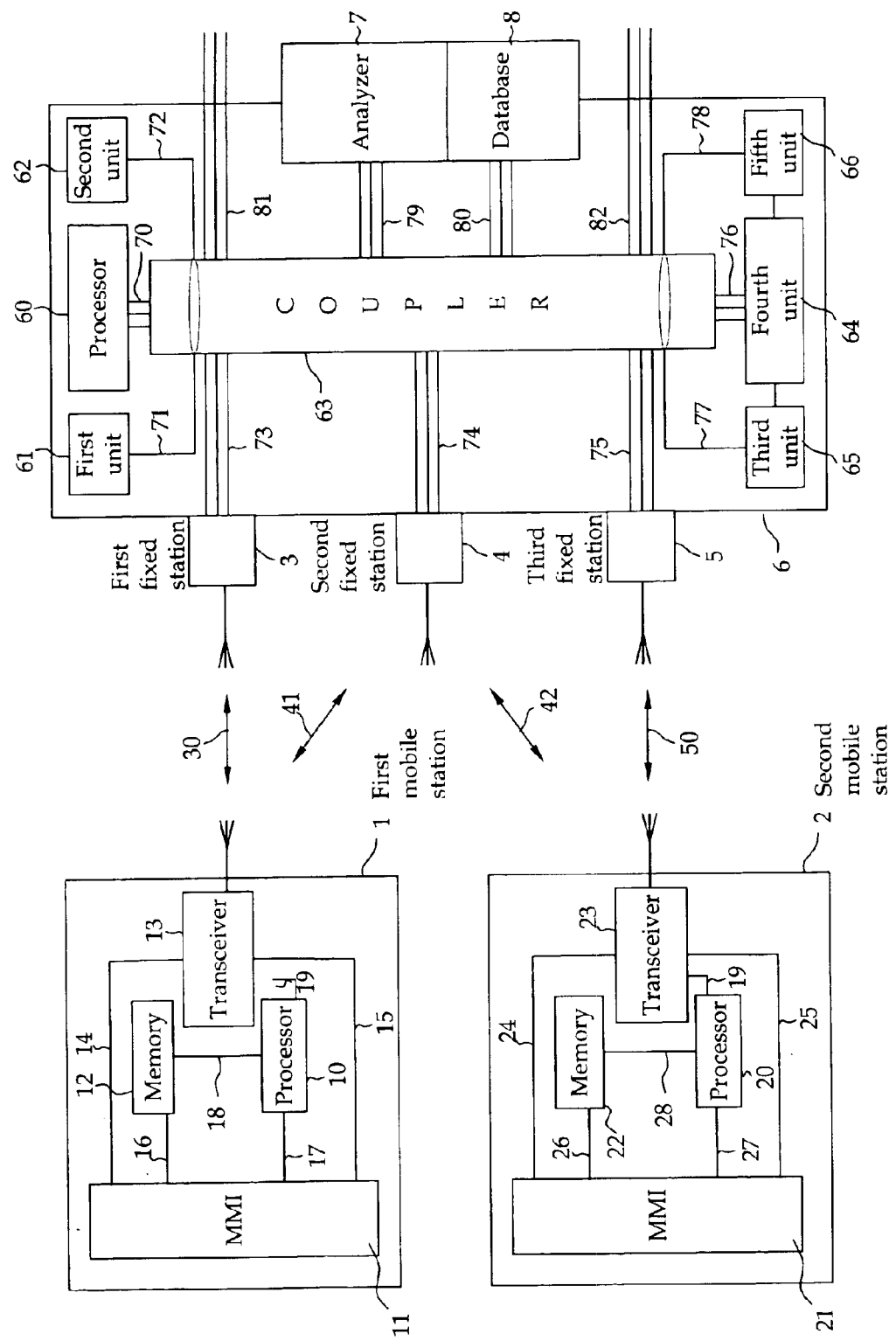

The telecommunication system according to the invention comprises a first mobile station 1, a second mobile station 2 and a switch 6 coupled to a first fixed station 3 and to a second fixed station 4 and to a third fixed station 5. Said switch is coupled to and/or comprises an analyser 7 and a database 8.

Mobile station 1 comprises a processor 10 coupled via a control connection 17 to a man-machine-interface 11 or mmi 11 and via a control connection 19 to a transceiver 13 and via a control connection 18 to a memory 12 which via a connection 16 is coupled to mmi 11. An input of mmi 11 is coupled via a connection 14 to an output of transceiver 13, and an output of mmi 11 is coupled via a connection 15 to an input of transceiver 13, of which an in/output is coupled to an antennae for mobile communication via a mobile coupling 30 to fixed station 3 and/or via a mobile coupling 41 to fixed station 4.

Mobile station 2 comprises a processor 20 coupled via a control connection 27 to a man-machine-interface 21 or mmi 21 and via a control connection 29 to a transceiver 23 and via a control connection 28 to a memory 22 which via a connection 26 is coupled to mmi 21. An input of mmi 21 is coupled via a connection 24 to an output of transceiver 23, and an output of mmi 21 is coupled via a connection 25 to an input of transceiver 23, of which an in/output is coupled to an antennae for mobile communication via a mobile coupling 50 to fixed station 5 and via a mobile coupling 42 to fixed station 4.

Switch 6 comprises a processor 60 coupled via control connections 70 to a coupler 63 and via a control connection to a first unit 61 and via a control connection to a second unit 62, with unit 61 being coupled to coupler 63 via connection 71 and with unit 62 being coupled to coupler 63 via connection 72. Fixed station 3 is coupled via connections 73 to coupler 63, fixed station 4 is coupled via connections 74 to coupler 63, and fixed station 5 is coupled via connections 75 to coupler 63. Switch 6 further comprises a third unit 65 coupled to coupler 63 via connection 77, a fourth unit 64 coupled to coupler 63 via connections 76 and a fifth unit 66 coupled via connection 78. Analyser 7 is coupled via connections 79 to coupler 63, and database 8 is coupled via connections 80 to coupler 63, which is further coupled to outgoing/incoming connections 81 and 82.

The telecommunication system according to the invention as shown in FIG. 1 functions as follows.

According to a first embodiment, a first user (like for example a subscriber) carrying first mobile station 1 enters a cell covered by fixed station 4, in response to which a first identification code defining mobile station 1 (for example by IMSI etc.) and/or defining said first user (for example by pincode and/or speaker recognition and/or finger print etc.) is sent (for example as a (part of a) signalling signal) from mobile station 1 to switch 6 via fixed station 4 and via mobile coupling 41. Said first identification code flows via connections 74 to coupler 63, and via control connections 70 processor 60 is informed (for example with first unit 61 being a detector for detecting codes possibly in cooperation with second unit 62 being a memory), which controls coupler 63 in such a way that database 8 is informed of the presence of said first identification code and that said first identification code flows via connections 81 to a central database not shown for collecting first subscriber-information stored in said central database in a secured (encrypted) way. Said first subscriber-information arrives via connections 81 and is stored under control of processor 60 via coupler 63 in database 8 in relation to said first identification code (which implies that for example said first identification code and said first subscriber-information are stored at the same address or at the same group of addresses or in the same row/column of a table memory or that for example said first identification code is (partly) used for addressing a location for storing said first subscriber-information etc.).

A second user (like for example a subscriber) carrying second mobile station 2 enters a cell covered by fixed station 4, in response to which a second identification code defining mobile station 2 (for example by IMSI etc.) and/or defining said second user (for example by pincode and/or speaker recognition and/or finger print etc.) is sent (for example as a (part of a) signalling signal) from mobile station 2 to switch 6 via fixed station 4 and via mobile coupling 42. Said second identification code flows via connections 74 to coupler 63, and via control connections 70 processor 60 is informed (for example with first unit 61 being a detector for detecting codes possibly in cooperation with second unit 62 being a memory), which controls coupler 63 in such a way that database 8 is informed of the presence of said second identification code and that said second identification code flows via connections 81 to a central database not shown for collecting second subscriber-information stored in said central database in a secured (encrypted) way. Said second subscriber-information arrives via connections 81 and is stored under control of processor 60 via coupler 63 in database 8 in relation to said second identification code (which implies that for example said second identification code and said second subscriber-information are stored at the same address or at the same group of addresses or in the same row/column of a table memory or that for example said second identification code is (partly) used for addressing a location for storing said second subscriber-information etc.).

Processor 60 knowing that database 8 comprises said first and second subscriber-information then orders analyser 7 via control connections 70 and coupler 63 and connections 79 to start analysing said first and second subscriber-information, for example by detecting said first subscriber-information having a first value indicating that a taxi is needed and said second subscriber-information having a second value indicating that a taxi is offered. In response to this analysis result, analyser 7 informs processor 60 in response to which for example a first message is transmitted to said first mobile station (for example via third unit 65 being a transmitter for transmitting messages), which first message at mobile station 1 via a display of mmi 11 is displayed and/or via a loudspeaker of mmi 11 is generated as voice for indicating that said taxi is available, and/or in response to which a second message is transmitted to said second mobile station (for example via third unit 65 being a transmitter for transmitting messages), which second message at mobile station 2 via a display of mmi 21 is displayed and/or via a loudspeaker of mmi 21 is generated as voice for indicating that said taxi is needed. Thereby, either per message an identification code and/or telephone number and/or email address etc. is presented (due to said identification code and/or telephone number and/or email address etc. forming part of said subscriber-information and/or is added during the analysis via database 8 and/or memory 62 or is added during message creation in transmitter 65 via database 8 and/or memory 62 etc.) to allow one party to contact the other party, or a party after receival of a message is invited to generate and send a reaction signal destined for the other party (and in switch 6 for example to be detected by detector 61 and possibly to be converted via memory 62). Such a message (signal) is transmitted as a (part of a) signalling signal or as a (part of a) data signal via a circuit-switched or packet-switched connection.

As described above, said first and second subscriber-information arrives via connections 81 from a central database not shown. Thereto, said first and/or second subscriber-information must have been stored before in this central database, which for example is done before said first and/or second user have entered said cell, for example by making a phone call or by sending an email or by visiting a web site by either using said first and/or second mobile station or by using a pc and/or an other telephone at home etc. After having received said first and/or second message, said first and/or second user might want to change the first and/or second subscriber-information stored in a database, which could be done the same way as described before, or could be done automatically when responding to said first and/or second message by sending said reaction signal and/or making said phone call an/or sending said email and/or visiting said web site now however usually via said first and/or second mobile station.

According to a first alternative to said first embodiment, together with said identification codes, or after said identification codes are exchanged, update codes are transmitted from mobile station to switch 6, defining for example that new subscriber-information is to be downloaded. Said update codes are either already stored in said mobile stations and generated automatically or in response to a user action, or are entered by said user, and are detected by detector 61 etc.

According to a second alternative to said first embodiment, said first user carrying first mobile station 1 enters said cell covered by fixed station 4, in response to which a first identification code is sent, etc., and processor 60 is informed, which controls coupler 63 in such a way that database 8 is informed of the presence of said first identification code and controls transmitter 65 in such a way that a first invitation is sent to mobile station 1. Such an invitation (signal) is transmitted as a (part of a) signalling signal or as a (part of a) data signal via a circuit-switched or packet-switched connection. Said first invitation is displayed at mobile station 1 via a display of mmi 11 and/or generated as voice via a loudspeaker of mmi 11 for inviting said first user to enter said first subscriber-information. This first subscriber-information is entered via a keyboard of mmi 11 or via speech and a microphone of mmi 11 or via a smart card and a smart card reader of mmi 11 etc. and/or has already been stored in memory 12, and is sent to switch 6, as a (part of a) signalling signal or as a (part of a) data signal via a circuit-switched or packet-switched connection. In switch 6 said first subscriber-information arrives via connections 74 and is stored under control of processor 60 via coupler 63 in database 8 in relation to said first identification code (which implies that for example said first identification code and said first subscriber-information are stored at the same address or at the same group of addresses or in the same row/column of a table memory or that for example said first identification code is (partly) used for addressing a location for storing said first subscriber-information etc.).

Said second user carrying second mobile station 2 enters said cell covered by fixed station 4, in response to which a second identification code is sent, etc., and processor 60 is informed, which controls coupler 63 in such a way that database 8 is informed of the presence of said second identification code and controls transmitter 65 in such a way that a second invitation is sent to mobile station 2. Such an invitation (signal) is transmitted as a (part of a) signalling signal or as a (part of a) data signal via a circuit-switched or packet-switched connection. Said second invitation is displayed at mobile station 2 via a display of mmi 21 and/or generated as voice via a loudspeaker of mmi 21 for inviting said second user to enter said second subscriber-information. This second subscriber-information is entered via a keyboard of mmi 21 or via speech and a microphone of mmi 21 or via a smart card and a smart card reader of mmi 21 etc. and/or has already been stored in memory 22, and is sent to switch 6, as a (part of a) signalling signal or as a (part of a) data signal via a circuit-switched or packet-switched connection. In switch 6 said second subscriber-information arrives via connections 74 and is stored under control of processor 60 via coupler 63 in database 8 in relation to said second identification code (which implies that for example said second identification code and said second subscriber-information are stored at the same address or at the same group of addresses or in the same row/column of a table memory or that for example said second identification code is (partly) used for addressing a location for storing said second subscriber-information etc.).

Processor 60 knowing that database 8 now comprises said first and second subscriber-information then orders analyser 7 via control connections 70 and coupler 63 and connections 79 to start analysing said first and second subscriber-information, etc. as described before, and in response said first message and/or said second message are transmitted, etc. as described before.

According to a third alternative to said first embodiment, a first user carrying first mobile station 1 enters a cell covered by fixed station 4, in response to which a first identification code is sent, etc., and processor 60 is informed, which controls coupler 63 in such a way that database 8 is informed of the presence of said first identification code and that said first identification code flows via connections 81 to a central database not shown for collecting first subscriber-information stored in said central database in a secured (encrypted) way. Said first subscriber-information arrives via connections 81 and is stored under control of processor 60 via coupler 63 in database 8 in relation to said first identification code.

Processor 60 then controls transmitter 65 in such a way that a third invitation is sent to mobile station 1. Such an invitation (signal) is transmitted as a (part of a) signalling signal or as a (part of a) data signal via a circuit-switched or packet-switched connection. Said third invitation is displayed at mobile station 1 via a display of mmi 11 and/or generated as voice via a loudspeaker of mmi 11 for inviting said first user to enter a first purpose code. This first purpose code is entered via a keyboard of mmi 11 or via speech and a microphone of mmi 11 or via a smart card and a smart card reader of mmi 11 etc. and/or has already been stored in memory 12, and is sent to switch 6, as a (part of a) signalling signal or as a (part of a) data signal via a circuit-switched or packet-switched connection. In switch 6 said first purpose code arrives via connections 74 and is stored under control of processor 60 via coupler 63 in database 8 in relation to said first identification code.

A second user carrying second mobile station 2 enters a cell covered by fixed station 4, in response to which a second identification code is sent, etc., and processor 60 is informed, which controls coupler 63 in such a way that database 8 is informed of the presence of said second Identification code and that said second identification code flows via connections 81 to a central database not shown for collecting second subscriber-information stored in said central database in a secured (encrypted) way. Said second subscriber-information arrives via connections 81 and is stored under control of processor 60 via coupler 63 in database 8 in relation to said second identification code.

Processor 60 then controls transmitter 65 in such a way that a fourth invitation is sent to mobile station 2. Such an invitation (signal) is transmitted as a (part of a) signalling signal or as a (part of a) data signal via a circuit-switched or packet-switched connection. Said fourth invitation is displayed at mobile station 2 via a display of mmi 21 and/or generated as voice via a loudspeaker of mmi 21 for inviting said first user to enter a second purpose code. This second purpose code is entered via a keyboard of mmi 21 or via speech and a microphone of mmi 21 or via a smart card and a smart card reader of mmi 21 etc. and/or has already been stored in memory 22, and is sent to switch 6, as a (part of a) signalling signal or as a (part of a) data signal via a circuit-switched or packet-switched connection. In switch 6 said second purpose code arrives via connections 74 and is stored under control of processor 60 via coupler 63 in database 8 in relation to said second identification code.

Processor 60 knowing that database 8 comprises said first and second subscriber-information then orders analyser 7 via control connections 70 and coupler 63 and connections 79 to start analysing said first and second subscriber-information, etc. as described before, whereby said analysing now however is limited to those parts of said first and second subscriber-information respectively as defined by said first and second purpose code respectively, and in response said first message and/or said second message are transmitted, etc. as described before. As a result, thanks to the purpose codes, a lot of subscriber-information is downloaded into database 8, but just a small part defined by purpose codes need to be analysed and users need to send just short purpose codes: a very efficient solution. And after having received said first and/or second message, said first and/or second user might want to change the first and/or second subscriber-information stored in a database, which could be done by sending a third and/or fourth purpose code defining what parts need to be changed and/or how they are to be changed.

According to a second embodiment, contrary to said first embodiment where fixed station 4 was involved all the time, now different fixed stations 3 and 5 are involved. A first user carrying first mobile station 1 enters a cell covered by fixed station 3, in response to which a first identification code defining mobile station 1 (for example by IMSI etc.) and/or defining said first user (for example by pincode and/or speaker recognition and/or finger print etc.) is sent (for example as a (part of a) signalling signal) from mobile station 1 to switch 6 via fixed station 3 and via mobile coupling 30. Said first identification code flows via connections 74 to coupler 63, and via control connections 70 processor 60 is informed (for example with first unit 61 being a detector for detecting codes possibly in cooperation with second unit 62 being a memory), which controls coupler 63 in such a way that fifth unit 66 being a generator for generating location codes generates a first location code (due to said first identification code arriving via fixed station 3) and that database 8 is informed of the presence of said first identification code and of said first location code and that said first identification code flows via connections 81 to a central database not shown for collecting first subscriber-information stored in said central database in a secured (encrypted) way. Said first subscriber-information arrives via connections 81 and is stored under control of processor 60 via coupler 63 in database 8 in relation to said first identification code.

A second user carrying second mobile station 2 enters a cell covered by fixed station 5, in response to which a second identification code defining mobile station 2 (for example by IMSI etc.) and/or defining said second user (for example by pincode and/or speaker recognition and/or finger print etc.) is sent (for example as a (part of a) signalling signal) from mobile station 2 to switch 6 via fixed station 5 and via mobile coupling 50. Said second identification code flows via connections 74 to coupler 63, and via control connections 70 processor 60 is informed (for example with first unit 61 being a detector for detecting codes possibly in cooperation with second unit 62 being a memory), which controls coupler 63 in such a way that fifth unit 66 being a generator for generating location codes generates a second location code (due to said second identification code arriving via fixed station 5) and database 8 is informed of the presence of said second identification code and of said second location code and that said second identification code flows via connections 81 to a central database not shown for collecting second subscriber-information stored in said central database in a secured (encrypted) way. Said second subscriber-information arrives via connections 81 and is stored under control of processor 60 via coupler 63 in database 8 in relation to said second identification code.

Processor 60 knowing that database 8 comprises said first and second subscriber-information then orders analyser 7 via control connections 70 and coupler 63 and connections 79 to start analysing said first and second subscriber-information, now at the hand of both first and second location codes: due to both first and second location codes defining different fixed stations which are not that far apart, said analysing of said first and second subscriber-information is to be done as usual, etc. as described before, and in response said first message and/or said second message are transmitted, etc. as described before.

According to a first alternative to said second embodiment, said analysing of said first and second subscriber-information, is again done at the hand of both first and second location codes: but now due to both first and second location codes defining different fixed stations and/or defining different fixed stations which are too for apart, said analysing of said first and second subscriber-information is not done, due to both users being too far apart from one another, etc.

According to a second alternative to said second embodiment, a part of said analysing of said first and second subscriber-information is done at the hand of both said first and second location codes, and an other part is done independently of said location codes, etc.

According to a third alternative to said second embodiment, said first and second subscriber-information originates from mobile stations 1 and 2, etc.

According to a fourth alternative to said second embodiment, said purpose codes and/or update codes on the one hand and said location codes on the other hand are used together, etc.

According to a third embodiment, said first subscriber-information has already been stored in database 8, with said first user carrying first mobile station 1 already being in said cell covered by fixed station 4. Then said first user decides that (a part of) said first subscriber-information needs to be amended. Thereto said first user enters a first update code via a keyboard of mmi 11 or via speech and a microphone of mmi 11 or via a smart card and a smart card reader of mmi 11 etc. and/or said first update code has already been stored in memory 12 and is read out from memory 12 in response to a user action, and is sent to switch 6, as a (part of a) signalling signal or as a (part of a) data signal via a circuit-switched or packet-switched connection, together with said first identification code or separated from it. In switch 6 said first update code arrives via connections 74 at coupler 63 and is detected by detector 61, in response to which said first subscriber-information in database 8 is amended, for example from a zero value indicating at the moment nothing needed/offered into a second value indicating that a taxi is offered.

Then said second user carrying second mobile station 2 already being in said cell covered by fixed station 4 decides that a taxi is needed. Then said second user enters a second purpose code via a keyboard of mmi 11 or via speech and a microphone of mmi 11 or via a smart card and a smart card reader of mmi 11 etc. and/or said second purpose code has already been stored in memory 12 and is read out from memory 12 in response to a user action, and is sent to switch 6, as a (part of a) signalling signal or as a (part of a) data signal via a circuit-switched or packet-switched connection, together with said second identification code or separated from it. In switch 6 said second purpose code arrives via connections 74 at coupler 63 and is detected by detector 61, in response to which in database 8 a search is started for subscriber-information having said second value. As a result, said first subscriber-information is found, and for example a message is sent to said second user by transmitter 65 which message at mobile station 2 via a display of mmi 21 is displayed and/or via a loudspeaker of mmi 21 is generated as voice for indicating that said taxi is available. Thereby, either per message an identification code and/or telephone number and/or email address etc. is presented (due to said identification code and/or telephone number and/or email address etc. forming part of said subscriber-information and/or is added during message creation in transmitter 65 via database 8 and/or memory 62 etc.) to allow said second user to contact the other party, or said second user after receival of a message is invited to generate and send a reaction signal destined for the other party (and in switch 6 for example to be detected by detector 61 and possibly to be converted via memory 62). Such a message (signal) is transmitted as a (part of a) signalling signal or as a (part of a) data signal via a circuit-switched or packet-switched connection.

According to a first alternative to said third embodiment, said first subscriber-information has already been stored in database 8, and said first user carrying first mobile station 1 enters a cell covered by fixed station 4, in response to which a first identification code is sent from mobile station 1 to switch 6 via fixed station 4 and via mobile coupling 41. Said first identification code flows via connections 74 to coupler 63, and via control connections 70 processor 60 is informed, which controls coupler 63 in such a way that database 8 is informed of the presence of said first identification code.

Processor 60 then controls transmitter 65 in such a way that a fifth invitation is sent to mobile station 1. Such a fifth invitation (signal) is transmitted as a (part of a) signalling signal or as a (part of a) data signal via a circuit-switched or packet-switched connection. Said fifth invitation is displayed at mobile station 1 via a display of mmi 11 and/or generated as voice via a loudspeaker of mmi 11 for inviting said first user to enter a first update code or not. This first update code is entered via a keyboard of mmi 11 or via speech and a microphone of mmi 11 or via a smart card and a smart card reader of mmi 11 etc. and/or has already been stored in memory 12, and is sent to switch 6, as a (part of a) signalling signal or as a (part of a) data signal via a circuit-switched or packet-switched connection. In switch 6 said first update code arrives via connections 74 etc.

A second user carrying second mobile station 2 enters a cell covered by fixed station 4, in response to which a second identification code is sent from mobile station 2 to switch 6 via fixed station 4 and via mobile coupling 42. Said second identification code flows via connections 74 to coupler 63, and via control connections 70 processor 60 is informed, which controls coupler 63 in such a way that database 8 is informed of the presence of said second identification code.

Processor 60 then controls transmitter 65 in such a way that a sixth invitation is sent to mobile station 2. Such a sixth invitation (signal) is transmitted as a (part of a) signalling signal or as a (part of a) data signal via a circuit-switched or packet-switched connection. Said sixth invitation is displayed at mobile station 2 via a display of mmi 21 and/or generated as voice via a loudspeaker of mmi 21 for inviting said second user to enter a second purpose code. This second purpose code is entered via a keyboard of mmi 21 or via speech and a microphone of mmi 21 or via a smart card and a smart card reader of mmi 21 etc. and/or has already been stored in memory 22, and is sent to switch 6, as a (part of a) signalling signal or as a (part of a) data signal via a circuit-switched or packet-switched connection. In switch 6 said second purpose code arrives via connections 74 etc.

According to a second alternative to said third embodiment, said purpose codes and/or update codes on the one hand and said location codes on the other hand are used together, etc.

All embodiments are just embodiments and do riot exclude other embodiments not shown and/or described. All alternatives are just alternatives and do not exclude other alternatives not shown and/or described. Any (part of an) embodiment and/or any (part of an) alternative can be combined with any other (part of an) embodiment and/or any other (part of an) alternative.

Said mobile station, fixed station and switch car be in accordance with GSM, UMTS, DECT, ISDN, PSTN etc. Said construction of said mobile station, switch and analyser/database can be amended without departing from the scope of this invention. Parallel blocks can be connected serially, and vice versa, and each bus can be replaced by separate connections, and vice versa. Said units and circuits, as well as all other blocks shown and/or not shown, can be 100% hardware, or 100% software, of a mixture of both. Each unit, circuit and block can be integrated with a processor or any other part, and each function of a processor can be realised by a separate unit, circuit or block.

For example said location codes can be generated as described before via generator 66, and/or can be generated in/near each one of said fixed stations (and then for example to be combined with an identification code), and/or can be generated in/near each one of said mobile stations (and then for example to be combined with an identification code). Said identification codes and update codes and purpose codes can be stored in said mobile stations, and can be entered by users. With respect to said update codes and/or purpose codes, a dynamic behaviour may be introduced, whereby either said mobile stations or said analysers/databases keep records of what users are doing and in dependence adapt offered possibilities. Any code may optionally comprise signals resulting from mouse-clicks on for example HTML/WML pages.

Preferably, when a user has left a cell, and/or when a user has instructed the analyser/database that said analysing no longer is needed, and/or when a time interval has elapsed, subscriber-information present with respect to this user is removed from said database, for privacy reasons. Said system may further be triggered each time a user has instructed to do so or each time after a user has entered a cell or a group of cells or just once after a user has entered a cell or a group of cells.

Said analyser may be a comparator for comparing bits and/or bytes to analyse said first and second subscriber-information possibly in combination with a state machine: subscriber-information having value 00 indicating that a taxi is needed, value 01 indicating that a taxi is available, value 10 indicating that a man wants to date a woman, and value 11 indicating that a woman wants to date a man. Then, in case of first subscriber-information comprising value 00 and second subscriber-information comprising value 01 or vice versa, one or more messages are transmitted, for arranging said taxi, and in case of first subscriber-information comprising value 10 and second subscriber-information comprising value 11 or vice versa, one or more messages are transmitted, for arranging said date, etc. Of course, more complex analysers may be realised, for example at the hand of high level computer languages etc.

What is claimed is:

1. Telecommunication system comprising a network with fixed stations and comprising at least one mobile station for sending an identification code to said network via at least one fixed station and for allowing mobile communication to a subscriber using said mobile station, with said network comprising a database for storing subscriber-information indicating a interest of the subscriber to be matched with an interest of another subscriber, characterized in that said database comprises subscriber-information related to said identification code for allowing at least a part of said subscriber-information at least to be exposed to at least one further subscriber, with said mobile station comprising a transmitter for transmitting an update code to said network via at least one fixed station, and with said network comprising a receiver for receiving said update code for updating at least a part of said subscriber-information stored in said database.

2. Telecommunication system according to claim 1, characterized in that said update code for updating at least a part of said subscriber-information defines at least either the amending of subscriber-information already stored or the storing of new subscriber-information.

3. Telecommunication system according to claim 1, characterized in that said database comprises first subscriber-information related to a first identification code defining a first subscriber and comprises second subscriber-information related to a second identification code defining a second subscriber, with said network comprising an analyzer for analyzing specific subscriber-information and comprising a transmitter for in dependence of an analysis result transmitting at least one message.

4. Telecommunication system according to claim 3, characterized in that said analyzing of specific subscriber-information is dependent upon a specific purpose code originating from a specific mobile station.

5. Telecommunication system according to claim 4, characterized in that said specific purpose code defines which part of said specific subscriber-information is at least to be analyzed.

6. Telecommunication system according to claim 4, characterized in that said specific purpose code defines which part of said specific subscriber-information is at least to be amended and/or exposed.

7. Telecommunication system according to claim 3, characterized in that said analyzing and/or exposing of specific subscriber-information is dependent upon a specific location code defining which specific fixed station is involved and/or a location of said mobile station.

8. Mobile station for use in a telecommunication system comprising a network with fixed stations and comprising said mobile station for sending an identification code to said network via at least one fixed station and for allowing mobile communication to a subscriber using said mobile station, with said network comprising a database for storing subscriber-information indicating a interest of the subscriber to be matched with an interest of another subscriber, characterized in that said database comprises subscriber-information related to said identification code for allowing at least a part of said subscriber-information at least to be exposed to at least one further subscriber, with said mobile station comprising a transmitter for transmitting an update code to said network via at least one fixed station, and with said network comprising a receiver for receiving said update code for updating at least a part of said subscriber-information stored in said database.

9. Database for use in a telecommunication system comprising a network with fixed stations and comprising at least one mobile station for sending an identification code to said network via at least one fixed station and for allowing mobile communication to a subscriber using said mobile station, with said network comprising said database for storing subscriber-information indicating a interest of the subscriber to be matched with an interest of another subscriber, characterized in that said database comprises subscriber-information related to said identification code for allowing at least a part of said subscriber-information at least to be exposed to at least one further subscriber, with said mobile station comprising a transmitter for transmitting an update code to said network via at least one fixed station, and with said network comprising a receiver for receiving said update code for updating at least a part of said subscriber-information stored in said database.

10. Method for use in a telecommunication system comprising a network with fixed stations and comprising at least one mobile station for sending an identification code to said network via at least one fixed station and for allowing mobile communication to a subscriber using said mobile station, with said network comprising a database for storing subscriber-information indicating a interest of the subscriber to be matched with an interest of another subscriber, characterized in that said database comprises subscriber-information related to said identification code for allowing at least a part of said subscriber-information at least to be exposed to at least one further subscriber, with said method comprises the steps of transmitting an update code from said mobile station to said network via at least one fixed station, and of receiving said update code by said network for updating at least a part of said subscriber-information stored in said database.

* * * * *